(12) United States Patent
Qin

(10) Patent No.: US 9,690,025 B2
(45) Date of Patent: Jun. 27, 2017

(54) POLARIZER AND DISPLAY DEVICE

(71) Applicant: BOE TECHNOLOGY GROUP CO., LTD., Beijing (CN)

(72) Inventor: Guangkui Qin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 507 days.

(21) Appl. No.: 14/359,371

(22) PCT Filed: Jun. 17, 2013

(86) PCT No.: PCT/CN2013/077338
§ 371 (c)(1),
(2) Date: May 20, 2014

(87) PCT Pub. No.: WO2014/153852
PCT Pub. Date: Oct. 2, 2014

(65) Prior Publication Data
US 2015/0219814 A1 Aug. 6, 2015

(30) Foreign Application Priority Data
Mar. 28, 2013 (CN) .......................... 2013 1 0105035

(51) Int. Cl.
G02B 5/30 (2006.01)
G02B 27/28 (2006.01)
G02B 1/14 (2015.01)

(52) U.S. Cl.
CPC ............ *G02B 5/3083* (2013.01); *G02B 1/14* (2015.01); *G02B 5/3041* (2013.01)

(58) Field of Classification Search
CPC .. G02B 5/3083; G02B 5/3033; G02B 27/286; G02B 5/3016; G02B 1/04; G02B 1/041; G02B 1/105; G02B 5/3025; G02B 5/305; G02B 1/111; G02B 27/281; G02B 27/283;
(Continued)

(56) References Cited

U.S. PATENT DOCUMENTS

| 6,577,364 | B1 | 6/2003 | Tillin et al. |
| 2006/0232733 | A1 | 10/2006 | Shibazaki |
| 2007/0126960 | A1 | 6/2007 | Joten |

(Continued)

FOREIGN PATENT DOCUMENTS

| CN | 1791831 A | 6/2006 |
| CN | 1957294 A | 5/2007 |

(Continued)

OTHER PUBLICATIONS

JP 2003-035820 A Original and Machine translation.*
(Continued)

Primary Examiner — Scott J Sugarman
Assistant Examiner — Sharrief Broome
(74) Attorney, Agent, or Firm — Collard & Roe, P.C.

(57) ABSTRACT

A polarizer is disclosed and it is used in combination with a reflection layer. The polarizer comprises a polarizing layer (702) and a compensation layer (704). The compensation layer (704) is disposed between the polarizing layer (702) and the reflection layer. Accordingly, a display device comprising the polarizer is also disclosed. The polarizer solves the problem of oblique light leakage of OLED displays.

18 Claims, 5 Drawing Sheets

(58) Field of Classification Search
CPC ........ G02B 5/04; G02B 5/122; G02B 5/3008; G02B 17/08; G02B 17/0892
See application file for complete search history.

(56) References Cited

U.S. PATENT DOCUMENTS

| | | |
|---|---|---|
| 2007/0242200 A1 | 10/2007 | Shibazaki |
| 2009/0002580 A1 | 1/2009 | Matsushima et al. |
| 2011/0222155 A1 | 9/2011 | Sakai et al. |
| 2012/0313918 A1 | 12/2012 | Qin et al. |

FOREIGN PATENT DOCUMENTS

| | | | | |
|---|---|---|---|---|
| CN | 101276091 A | | 10/2008 | |
| CN | 102707489 A | | 10/2012 | |
| EP | 0840160 A2 | | 5/1998 | |
| JP | 2003-035820 A | * | 2/2003 | ............... G02B 5/30 |
| JP | 2003035820 A | | 2/2003 | |
| JP | 2007156085 A | | 6/2007 | |
| WO | 2012070808 A2 | | 5/2012 | |

OTHER PUBLICATIONS

Chinese Office Action of Chinese Application No. 201310105035.7 with English translation, mailed Sep. 19, 2014.
English Translation of the International Search Report of PCT/CN2013/077338 published in English on Oct. 2, 2014.
International Search Report, International Preliminary Report on Patentability and Written Opinion of the International Searching Authority of PCT/CN2013/077338 in Chinese, mailed Jan. 2, 2014.
Second Chinese Office Action of Chinese Application No. 201310105035.7, mailed Mar. 9, 2015 with English translation.
English translation of the International Preliminary Report on Patentability and Written Opinion of the International Searching Authority of PCT/CN2013/077338, issued Sep. 29, 2015.
Patent Certificate of Chinese Application No. 201310105035.7, issued Sep. 16, 2015.

* cited by examiner spontaneous light ambient light ambient light

POLARIZER AND DISPLAY DEVICE

CROSS REFERENCE TO RELATED APPLICATIONS

This application is the National Stage of PCT/CN2013/077338 filed on Jun. 17, 2013, which claims priority under 35 U.S.C. §119 of Chinese Application No. 201310105035.7 filed on Mar. 28, 2013, the disclosure of which is incorporated by reference.

FIELD OF THE ART

The invention relates to the field of display technologies, more particularly, to a polarizer and a display device comprising the polarizer.

BACKGROUND

An Organic Light-Emitting Diode (OLED) display, also known as an organic Electroluminescent (EL) display, is a novel flat-panel display device. Having advantages of simple fabrication process, low cost, low power consumption, high luminous brightness, adaptable operation temperatures, light and compact, fast response, easily achieved in colorful displays and large screen displays, easily compatible with Integrated Circuit (IC) drivers, and easily implemented as flexible displays, OLED displays have a bright application prospect.

As illustrated in FIG. 1, a display device in the OLED display generally comprises a base substrate 1, a semiconductor layer 2 (also known as an ITO layer) and an electrode layer 6 sequentially disposed on the base substrate 1, as well as structural layers disposed between the semiconductor layer 2 and the electrode layer 6. Herein, the semiconductor layer 2 is connected to a positive terminal of a power and functions as an anode, the electrode layer 6 is connected to a negative terminal of the power and functions as a cathode. The structural layers comprise a Hole Transmission Layer (HTL) 3 connected to the semiconductor layer 2, an Electron Transmission Layer (ETL) 5 connected to the electrode layer 6, and an EL layer 4 disposed between the HTL 3 and the ETL 5. When an appropriate voltage is applied to the semiconductor layer 2 and the electrode layer 6, holes generated by the anode and charges generated by the cathode will combine with each other in the EL layer 4 to produce light; moreover, three primary colors of red (R), green (G), blue (B) are respectively produced based on different schemes, to form basic colors.

Due to that the electrode layer 6 is generally made of a metal, it has a high reflectivity; as a result, when the OLED display is used outdoors under a strong ambient light, the reflected light will make the outdoors readability relatively poor. Currently, a circular polarizer is normally used to solve the above problem. As illustrated in FIGS. 2 and 3, the circular polarizer 7 is disposed on a surface of the base substrate 1 that is far from the electrode layer 6, and the circular polarizer 7 sequentially comprises a protection layer 701, a polarizing layer 702 and a quarter-wave plate 703 along an incident direction of the ambient light; wherein the quarter-wave plate generally employs a uniaxial phase retarder, normally with a refractive index factor Nz of 0 or 1.

When the ambient light is incident on the polarizing layer 702 vertically after passing the protection layer 701, light in one of the polarization directions is absorbed, and linearly polarized light having a polarization direction the same as the transmission axis of the polarizing layer 702 is transmitted. The linearly polarized light is turned into a left- or right-handed circularly polarized light after passing the quarter-wave plate 703 having an angle of 45° with the circularly polarized light. After being reflected by the electrode layer 6, the left- or right-handed circularly polarized light is turned into a right- or left-handed circularly polarized light with an opposite rotation direction and then turned into a linearly polarized light with a polarization direction the same as the absorbing axis of the polarizing layer 702 upon passing the quarter-wave plate 703 for a second time. The linearly polarized light is therefore absorbed by the polarizing layer 702, thereby preventing the ambient light from being reflected and improving the outdoor readability.

The circular polarizer absorbs almost all of vertically incident ambient light. However; for obliquely incident ambient light, in its polarization plane, the direction of the optical axis of the quarter-wave plate 703 or the transmission axis of the polarizing layer 702 will be deflected to a certain degree, which will cause the angle between the optical axis of the quarter-wave plate 703 and the transmission axis of the polarizing layer 702 to be changed, thereby causing light leakage. As illustrated in FIG. 4, the circular polarizer hardly transmits vertically incident ambient light; in contrast, it have a maximum light leakage rate of up to 5% for obliquely incident ambient light. Assuming luminous intensity per unit area for the Sun is 20000 nit, when the maximum light leakage rate of the circular polarizer for obliquely incident ambient light is 5%, light intensity of the reflected light may be up to 1000 nit, which will severely harm the outdoor readability of the OLED display. Moreover, the stronger the ambient light is, the poorer the outdoor readability of the OLED display is (in FIG. 4, azimuth angle is distributed along the outer circumference, and polar angle is distributed along the radius; and the relative light intensity is zero at locations having highest gray scale level. The lower the gray scale level is, the higher the relative light intensity is).

In the following, the principle of light leakage for the circular polarizer will be explained with reference to the Poincaré Sphere in which two axes S1 and S2 normal to each other are provided.

As illustrated in FIG. 5, when the ambient light is incident on the circular polarizer vertically, that is, when viewed from the normal line direction of the circular polarizer, the transmission axis of the polarizing layer 702 is normal to point A. Point A is an intersection point between the positive direction of the axis S1 and the circumference, and the optical axis 703A of the quarter-wave plate 703 coincides with the axis S2. In this case, the light incident on the circular polarizer is totally absorbed when passing the circular polarizer for a second time after being reflected by the electrode layer; thereby no light leakage will be caused.

As illustrated in FIG. 6, when the ambient light is incident on the circular polarizer along a direction having an azimuth angle of 0° and a polar angle of about 60°, that is, when viewed from an oblique direction of the circular polarizer, the transmission axis of the polarizing layer 702 is not deflected, and is still normal to the intersection point between the positive direction of the axis S1 and the circumference, while the direction of the optical axis 703A of the quarter-wave plate is deflected. In this case, the light incident on the circular polarizer cannot be totally absorbed when passing the circular polarizer for a second time after being reflected by the electrode layer, thereby causing light leakage. Based on symmetry of optical structures, light leakage will be caused as well when the azimuth angle is respectively 90°, 180° and 270°.

As illustrated in FIG. 7, when the ambient light is incident on the circular polarizer along a direction having an azimuth angle of about 45° and a polar angle of about 60°, that is, when viewed from another oblique direction of the circular polarizer, the direction of the optical axis 703A of the quarter-wave plate is not deflected, and still coincides with the axis S2, while the transmission axis of the polarizing layer 702 is deflected, that is, although the transmission axis of the polarizing layer 702 is still perpendicular to point A, point A is deflected from the intersection point between the positive direction of the axis S1 and the circumference. Such a case will cause light leakage too. Based on symmetry of optical structures, light leakage will be caused as well when the azimuth angle is respectively 135°, 225° and 315°.

SUMMARY

Embodiments of the invention provide a polarizer and a display device comprising the polarizer that solves the problem of oblique light leakage of OLED displays.

A first aspect of the invention provides a polarizer. The polarizer is configured as being used in combination with a reflection layer. The polarizer comprises a polarizing layer and a compensation layer, the compensation layer is disposed between the polarizing layer and the reflection layer.

A second aspect of the invention further provides a display device comprising the above polarizer.

A known circular polarizer uses a quarter-wave plate having a refractive index factor of 0 or 1 in combination with a polarizing layer and a reflection layer to prevent reflection of the ambient light. However, the ambient light obliquely incident on the circular polarizer will cause the optical axis of the quarter-wave plate or the transmission axis of the polarizing layer to deflect, thereby leading to the issue of oblique light leakage. That is, the known circular polarizer can only prevent ambient light vertically incident thereon from being reflected, while reflection of obliquely incident ambient light cannot be prevented.

The polarizer of the invention employs the compensation layer in combination with the polarizer layer and the reflection layer to prevent reflection of ambient light incident on the polarizer from various directions. When the compensation layer uses a quarter-wave plate with a refractive index factor Nz of 0.5 or two one-eighth wave plates with a sum of their refractive index factors Nz of 1, the deflection of the optical axis of the quarter-wave plate with a refractive index factor Nz of 0 or 1 in the known circular polarizer can be compensated, thereby compensating for light leakage at directions with polar angles of 40° to 80° and azimuth angles of about 0°, about 90°, about 180° and about 270°. When the compensation layer makes use of a single layer or two layers of optical compensation films, the deflection of the transmission axis of the polarizing layer in the known circular polarizer can be compensated, thereby compensating for light leakage at directions with polar angles of 40° to 80° and azimuth angles of about 45°, about 135°, about 225° and about 315°. When the compensation layer makes use of a quarter-wave plate with a refractive index factor Nz of 0.5 or two one-eighth wave plates with a sum of their refractive index factors Nz of 1 as well as a single layer or two layers of optical compensation films, the deflection of the optical axis of the quarter-wave plate and the deflection of the transmission axis of the polarizing layer in the known circular polarizer can be compensated at the same time, thereby reducing reflection of the ambient light obliquely incident on the polarizer to a maximum extent.

Therefore, the polarizer of the invention not only can prevent reflection of ambient light vertically incident thereon but also can maximally prevent reflection of the ambient light obliquely incident thereon. Moreover, when the polarizer of the invention is applied to an OLED display, the outdoor readability of the OLED display can be significantly improved.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

NUMERAL REFERENCES

Figure 1:
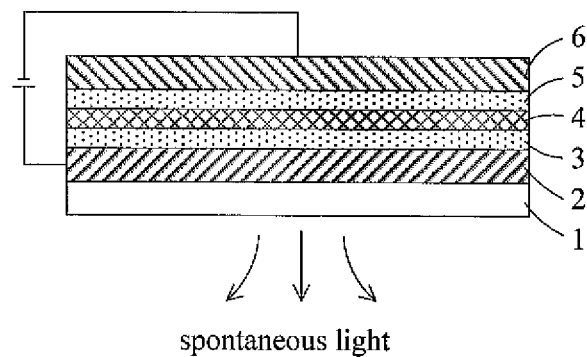
FIG. 1 schematically illustrates a configuration of a known OLED display device.
Figure 2:
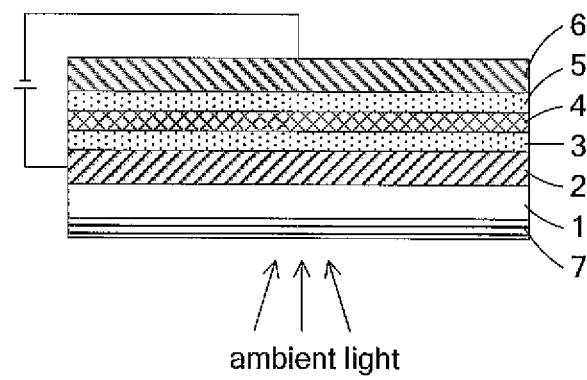
FIG. 2 schematically illustrates a configuration of another known OLED display device.

1—base substrate; 2—semiconductor layer; 3—Hole Transmission Layer (HTL); 4—EL layer; 5—Electron Transmission Layer (ETL); 6—electrode layer; 7—circular polarizer; 701—protection layer; 702—polarizing layer 702; 703—quarter-wave plate; 703A—optical axis of the quarter-wave plate; 7031—first one-eighth wave plate; 7032—second one-eighth wave plate; 704—optical compensation film; 7041—first optical compensation film; 7042—second optical compensation film.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

The embodiment provides a polarizer, which is configured as being used in combination with a reflection layer. The polarizer comprises a polarizing layer 702 and a compensation layer, the compensation layer is disposed between the polarizing layer 702 and the reflection layer. Light incident on the polarizer from various directions is incident on the compensation layer after being absorbed by the absorbing axis of the polarizing layer 702, the compensation layer and the reflection layer cooperate together to convert light incident on the compensation layer to a linearly polarized light having a polarization direction the same as the absorbing axis of the polarizing layer 702, the light is thus absorbed by the polarizing layer 702. The reflection layer may be made of any material that can reflect light, such as an electrode layer of an OLED display device.

That is to say, after being absorbed by the absorbing axis of the polarizing layer 702 and passing through the compensation layer sequentially, light incident on the polarizer from various directions is incident on the reflection layer. Reflected by the reflection layer and passing through the compensation layer again, the light is converted to a linearly polarized light with a polarization direction the same as the absorbing axis of the polarizing layer 702, and is thus absorbed by the polarizing layer 702. It thus prevents the light incident on the polarizer from various directions from emitting from the polarizer again after being reflected by the reflection layer to a maximum extent, thereby improving the outdoors readability of OLED displays using the polarizer; moreover, the viewing angle becomes better as well.

In the disclosure, the light incident on the polarizer from various directions comprises light vertically incident on the polarizer and light obliquely incident on the polarizer.

The embodiment further provides a display device comprising the above polarizer. The display device may be any display device having a reflection layer and needing to prevent ambient light reflection, such as a liquid crystal panel, an E-paper, an OLED panel, a mobile phone, a tablet PC, a television, a display, a notebook PC, a digital photoframe, a navigator and any product or component having a display function.

Embodiment 2

Figure 8:
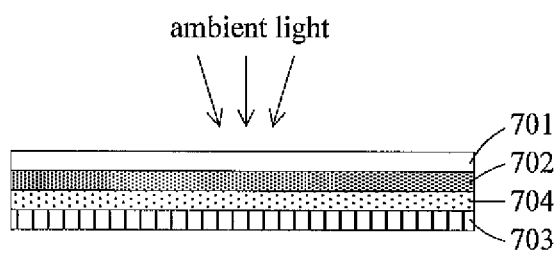
FIG. 8 schematically illustrates a configuration of a polarizer in accordance with Embodiment 2 of the invention.

As illustrated in FIG. 8, the embodiment provides a polarizer, which is configured as being used in combination with a reflection layer (not shown). The disposition relationship between the polarizer and the reflection layer is: disposing the polarizer and the reflection layer sequentially along an incident direction of the ambient light. The polarizer comprises a protection layer 701, a polarizing layer 702 and a compensation layer; the compensation layer is disposed between the polarizing layer 702 and the reflection layer, and comprises an optical compensation film 704 and a quarter-wave plate 703. The optical compensation film 704 is disposed between the polarizing layer 702 and the quarter-wave plate 703. The protection layer 701 is disposed on a surface of the polarizing layer 702 that is far from the compensation layer and the reflection layer.

Herein, the protection layer 701 needs to be subjected to a surface treatment. Different surface treatments may be performed on the protection layer 701 based on practical requirement. For example, hardening treatment is performed to prevent the polarizer from being scratched; low-reflection or anti-reflection treatment is performed to decrease the surface reflectivity of the polarizer and improve the outdoor readability; anti-glare treatment is performed to reduce interference from the ambient light, improve image resolution and visibility of the display device employing the polarizer, reduce screen reflection, thereby making the image clearer and more vivid. The quarter-wave plate 703 may be a quarter-wave plate in a conventional circular polarizer, that is to say, its refractive index factor Nz is 0 or 1. The optical compensation film 704 is made of a wave plate.

A refractive index factor Nz of the optical compensation film 704 is in a range from 0.3 to 0.4, the phase retardation R0 is in a range from 240 nm to 300 nm, and an angle between a slow axis of the optical compensation film and a transmission axis of the polarizing layer 702 is in a range from −5° to +5°.

As an example, the refractive index factor Nz of the optical compensation film 704 is 0.25, the phase retardation R0 is 275 nm, and the angle between the slow axis of the optical compensation film and the transmission axis of the polarizing layer 702 is 0°.

Alternatively, a refractive index factor Nz of the optical compensation film 704 is in a range from 0.7 to 0.8, the phase retardation R0 is in a range from 240 nm to 300 nm, and an angle between a slow axis of the optical compensation film and a transmission axis of the polarizing layer 702 is in a range from +85° to +95° or in a range from −95° to −85°.

As an example, the refractive index factor Nz of the optical compensation film 704 is 0.75, the phase retardation R0 is 275 nm, and the angle between the slow axis of the optical compensation film and the transmission axis of the polarizing layer 702 is +90° or −90°.

In the disclosure, $$Nz=(nx-nz)/(nx-ny) \quad (1)$$

$$R0=(nx-ny)\times d \quad (2)$$

In the above equations, Nz is the refractive index factor, R0 is the phase retardation, nx is the refractive index factor in the x direction, ny is the refractive index factor in the y direction, nz is the refractive index factor in the z direction, d is the thickness. In the embodiment, the above parameters are the parameters of the optical compensation film 704 only.

It is noted that a positive (+) angle between two axes in the invention is an angle covered when one of the two axes is rotated counterclockwise until parallel to another, while a negative (−) angle between two axes is an angle covered when one of the two axes is rotated clockwise until parallel to another. For example, if an angle between the slow axis of the optical compensation film and the transmission axis of the polarizing layer 702 is +90°, then the angle covered when rotating the slow axis of the optical compensation film to a direction parallel to the transmission axis of the polarizing layer 702 counterclockwise is 90°.

Figure 5:
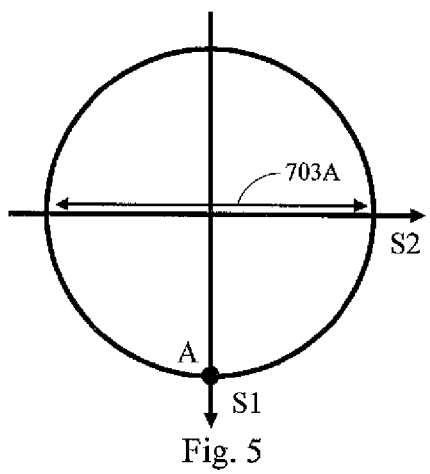
FIG. 5 is a cross section taken along equator of the Poincaré Sphere when ambient light is vertically incident on the circular polarizer of FIG. 3.
Figure 6:
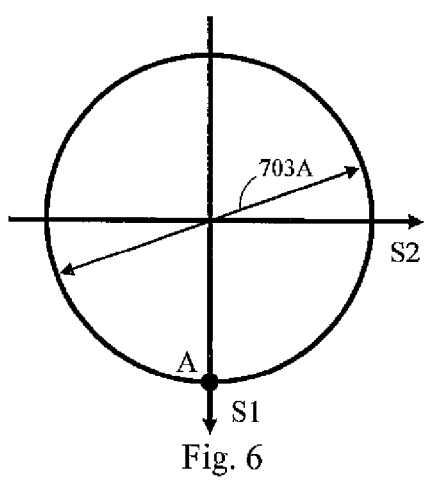
FIG. 6 is a cross section taken along equator of the Poincaré Sphere when ambient light is incident on the circular polarizer of FIG. 3 along a direction with an azimuth angle of 0° and a polar angel of 60°.
Figure 7:
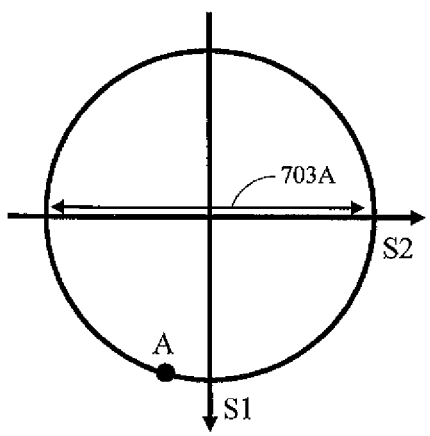
FIG. 7 is a cross section taken along equator of the Poincaré Sphere when ambient light is incident on the circular polarizer of FIG. 3 along a direction with an azimuth angle of 45° and a polar angel of 60°.

According to Poincaré Sphere analysis, when viewing a known circular polarizer from the vertical direction, the transmission axis of the polarizing layer 702 is perpendicular to point A, that is, the transmission axis of the polarizing layer 702 is perpendicular to an intersection point between the positive direction of the axis S1 and the circumference (as shown in FIG. 5). When viewing the known circular polarizer from a direction having a polar angle of about 60° (such as from 40° to 80°) and an azimuth angle of 45°, though the transmission axis of the polarizing layer 702 is still perpendicular to the point A, the point A has offset from the intersection point between the positive direction of the axis S1 and the circumference (as shown in FIG. 7). The compensation layer of the polarizer in the embodiment uses an optical compensation film 704, when the polarizer is viewed from the direction having a polar angle of about 60° (such as from 40° to 80°) and an azimuth angle of 45°, the optical axis of the optical compensation film 704 is at a position between the point A and the intersection point between the positive direction of the axis S1 and the circumference of FIG. 7; moreover, when the phase retardation R0 of the optical compensation film 704 is 275 nm, it is exactly equal to the phase retardation of a half wave plate. Therefore, the optical compensation film 704 brings the transmission axis of the polarizing layer 702 from the point A to the intersection point between the positive direction of the axis S1 and the circumference, thereby effectively compensating for the deflection experienced by the transmission axis of the polarizing layer 702 when the ambient light is obliquely incident. It also solves the problem light leakage in the oblique direction caused by the deflection of the transmission axis of the polarizing layer 702, making light leakage at all angles occurred to the polarizer improved to a certain extent, especially alleviating the light leakage for the directions with the polar angle of 40° to 80° and the azimuth angle of about 45°. According to the symmetry of optical structures, the polarizer of the embodiment also alleviates light leakage for directions with the polar angle of 40° to 80° and the azimuth angle of about 135°, 225° and 315°.

Figure 9:
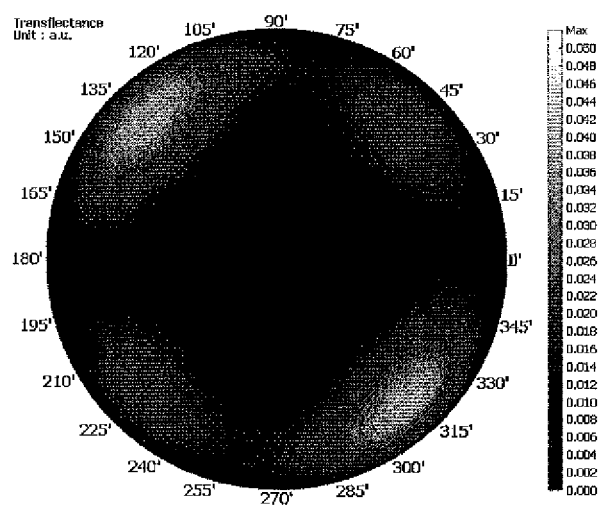
FIG. 9 is a diagram schematically illustrating light leakage at various viewing angles for the polarizer of Embodiment 2.

As illustrated in FIG. 9, when the refractive index factor Nz of the optical compensation film 704 is 0.25, the phase retardation R0 is 275 nm, the angle between its slow axis and the transmission axis of the polarizing layer 702 is 0°, and the refractive index factor Nz of the quarter-wave plate 703 is 1, the phase retardation R0 is 137.5, the angle between its slow axis and the transmission axis of the polarizing layer 702 is +45°, the maximum light leakage rate of the polarizer is about 3.5%. It is thus seen that in comparison with known circular polarizer, the maximum light leakage rate of the polarizer of the embodiment is reduced by about 1.5%, thereby improving the outdoor readability of OLED displays using the polarizer; moreover, the viewing angle becomes better as well.

The embodiment further provides a display device comprising the above polarizer.

Other structures and functions of the embodiment are the same as those in Embodiment 1 and will not be elaborated here.

Embodiment 3

The embodiment differs from Embodiment 2 in the following.

In the embodiment, the refractive index factor Nz of the quarter-wave plate 703 is in a range from 0.4 to 0.6, the phase retardation R0 is in a range from 110 nm to 160 nm, and the angle between the slow axis of the quarter-wave plate and a transmission axis of the polarizing layer 702 is in a range from +40° to +50° or in a range from −50° to −40°.

As an example, the refractive index factor Nz of the quarter-wave plate 703 is 0.5, the phase retardation is 137.5 nm, and the angle between the slow axis of the quarter-wave plate and the transmission axis of the polarizing layer 702 is +45° or −45°.

The compensation layer of the polarizer of the embodiment uses the optical compensation film 704 to solve the problem of oblique light leakage caused by the deflection of the transmission axis of the polarizing layer 702, especially alleviating the light leakage in the directions with the polar angle of 40° to 80° and the azimuth angle of about 45°, 135°, 225° and 315°. Meanwhile, a quarter-wave plate with a refractive index factor Nz of 0.5 is used. With such a quarter-wave plate with the refractive index factor Nz of 0.5, its optical axis will not deflect no matter viewed from any orientation and angle, that is, its optical axis coincides with those optical axis viewed vertically (overlapping the axis S2 of FIG. 5), therefore light obliquely incident on the polarizer will not cause the optical axis of the quarter-wave plate to deflect. In contrast, with conventional art, the refractive index factor Nz of the quarter-wave plate is normally 0 or 1, thus light obliquely incident on the known circular polarizer causes the optical axis of the quarter-wave plate therein to deflect. Therefore, the polarizer of the embodiment prevents the deflection of the optical axis of quarter-wave plate, solving the problem of oblique light leakage caused by the deflection of the optical axis of the quarter-wave plate in the known circular polarizer, reducing the light leakage at all angles occurred to the polarizer to a certain extent, especially alleviating the light leakage for the directions with the polar angle of 40° to 80° and the azimuth angle of about 0°. According to the symmetry of optical structures, the polarizer of the embodiment can also alleviate light leakage for directions with the polar angle of 40° to 80° and the azimuth angle of about 90°, 180° and 270°. That is to say, the polarizer of the embodiment compensates the problem of oblique light leakage caused by the deflection of the transmission axis of the polarizing layer 702 and the deflection of the optical axis of the quarter-wave plate at the same time, and simultaneously prevents the vertical and oblique light leakage of the polarizer, thus a better viewing angle is obtained.

Figure 10:
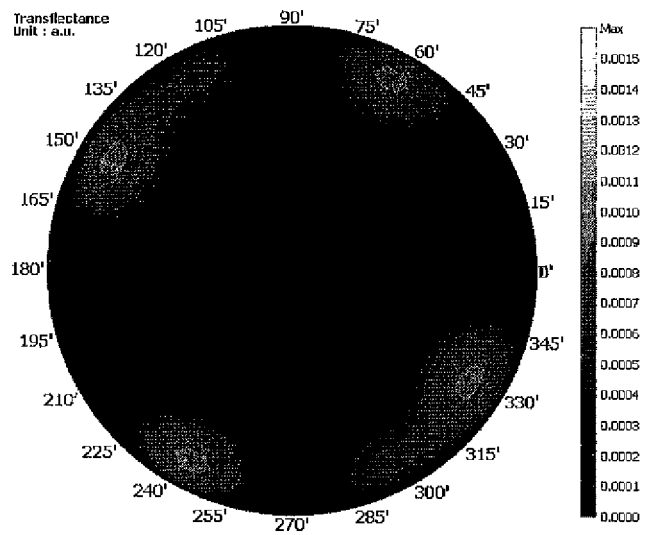
FIG. 10 is a diagram schematically illustrating light leakage at various viewing angles for the polarizer of Embodiment 3.

As illustrated in FIG. 10, when the refractive index factor Nz of the optical compensation film 704 is 0.25, the phase retardation R0 is 275 nm, the angle between its slow axis and the transmission axis of the polarizing layer 702 is 0°, and the refractive index factor Nz of the quarter-wave plate 703 is 1, the phase retardation R0 is 137.5, the angle between its slow axis and the transmission axis of the polarizing layer 702 is +45°, the maximum light leakage rate of the polarizer is about 0.12%. It is thus seen that in comparison with known circular polarizer, the maximum light leakage rate of the polarizer of the embodiment is reduced by about 4.88%, thereby improving the outdoor readability of OLED displays using the polarizer; moreover, the viewing angle is better as well.

The embodiment further provides a display device comprising the above polarizer.

Other structures and functions of the embodiment are the same as those in Embodiment 2 and will not be elaborated here.

Embodiment 4

Figure 11:
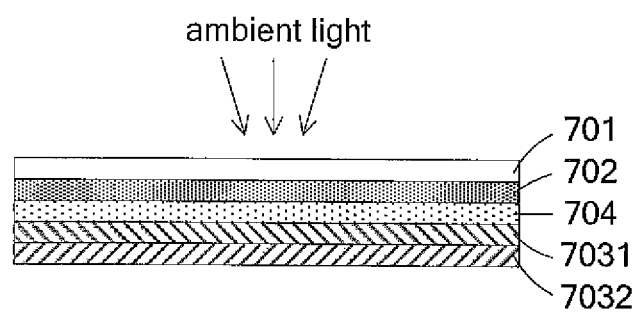
FIG. 11 schematically illustrates a configuration of a polarizer in accordance with Embodiment 4 of the invention.

As illustrated in FIG. 11, the embodiment differs from Embodiment 2 in the following.

In the embodiment, the quarter-wave plate 703 comprises a first one-eighth wave plate 7031 and a second one-eighth wave plate 7032, and polarity of the first one-eighth wave plate 7031 and that of the second one-eighth wave plate 7032 are opposite to each other; a sum of a refractive index factor Nz of the first one-eighth wave plate 7031 and a refractive index factor Nz of the second one-eighth wave plate 7032 is in a range from 0.85 to 1.15, phase retardations R0 of the first one-eighth wave plate 7031 and the second one-eighth wave plate 7032 are both in a range from 55 nm to 80 nm, slow axes of the first one-eighth wave plate 7031 and the second one-eighth wave plate 7032 are in the same direction and both have an angle of +40° to +50° or −50° to −40° with the transmission axis of the polarizing layer 702.

As an example, the sum of the refractive index factor Nz of the first one-eighth wave plate 7031 and the refractive index factor Nz of the second one-eighth wave plate 7032 is 1, the phase retardations R0 of the first one-eighth wave plate 7031 and the second one-eighth wave plate 7032 are both 69 nm, the slow axes of the first one-eighth wave plate 7031 and the second one-eighth wave plate 7032 are in the same direction and both have an angle of +45° or −45 with the transmission axis of the polarizing layer 702.

The compensation layer of the polarizer of the embodiment uses the optical compensation film 704 to solve the problem of oblique light leakage caused by the deflection of the transmission axis of the polarizing layer 702, especially alleviating the light leakage in the direction with the polar angle of 40° to 80° and the azimuth angle of about 45°, 135°, 225° and 315°. Meanwhile, the first one-eighth wave plate 7031 and the second one-eighth wave plate 7032 having opposite polarities are used. As the polarities of the two one-eighth wave plates are opposite, when viewing the polarizer of the embodiment in a direction with a polar angle of 40° to 80° and an azimuth angle of 0°, the deflection direction of the optical axis of the first one-eighth wave plate 7031 and that of the optical axis of the second one-eighth wave plate 7032 are exactly opposite to each other, which renders a counteract effect, thereby solving the issue of oblique light leakage caused by the deflection of the optical axis of the quarter-wave plate in the known circular polarizer, reducing the light leakage at all angles occurred to the polarizer to a certain extent, especially alleviating the light leakage for the direction with the polar angle of 40° to 80° and the azimuth angle of about 0°, 90°, 180° and 270°. Moreover, processes for forming an optical film with a refractive index factor larger than 0 and smaller than 1 are complicated and of high cost, plus the required phase retardation is large, making the thickness of the film relatively large and the implementation difficult. If the sum of the refractive index factor Nz of the first one-eighth wave plate 7031 and that of the second one-eighth wave plate 7032 is 1 (may also be larger than 1), the refractive index factor Nz of the first one-eighth wave plate 7031 and that of the second one-eighth wave plate 7032 can be respectively 0 and 1, that is, neither the refractive index factor Nz of the first one-eighth wave plate 7031 nor that of the second one-eighth wave plate 7032 is in the range of (0, 1), making it having the advantages of simple process and low cost. Meanwhile, each layer of one-eighth wave plate has relatively small phase retardation and a small thickness, making it easily implemented. That is to say, the polarizer of the embodiment compensates the problem of oblique light leakage caused by the deflection of the transmission axis of the polarizing layer 702 and the deflection of the optical axis of the quarter-wave plate at the same time, and simultaneously prevents the vertical and oblique light leakage of the polarizer, forming better viewing angles.

When the refractive index factor Nz of the optical compensation film 704 is 0.25, the phase retardation R0 is 275 nm, the angle between its slow axis and the transmission axis of the polarizing layer 702 is 0°, the refractive index factor Nz of the first one-eighth wave plate 7031 is 1, the phase retardation R0 is 68.75, the angle between its slow axis and the transmission axis of the polarizing layer 702 is +45°, and the refractive index factor Nz of the second one-eighth wave plate 7032 is 0, the phase retardation R0 is 68.75, the angle between its slow axis and the transmission axis of the polarizing layer 702 is −45°, the maximum light leakage rate of the polarizer is about 0.12% (that is, light leakage diagram at various angles of the polarizer with parameters described herein is the same as that illustrated in FIG. 10). It is thus seen that in comparison with known circular polarizer, the maximum light leakage rate of the polarizer of the embodiment is reduced by about 4.88%, thereby improving the outdoors readability of OLED displays using the polarizer; moreover, the viewing angle becomes better as well.

The embodiment further provides a display device comprising the above polarizer.

Other structures and functions of the embodiment are the same as those in Embodiment 2 and will not be elaborated here.

Embodiment 5

Figure 12:
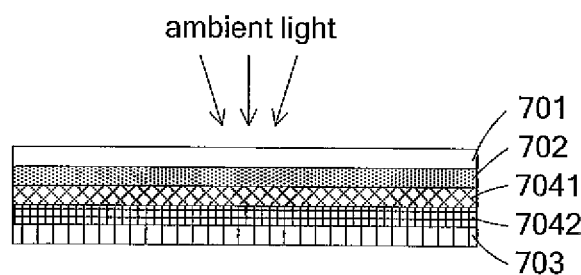
FIG. 12 schematically illustrates a configuration of a polarizer in accordance with Embodiment 5 of the invention.

As illustrated in FIG. 12, the embodiment differs from Embodiment 2 in the following.

In the embodiment, the compensation layer of the polarizer does not comprise the optical compensation film 704 of Embodiment 2. Instead, it comprises a first optical compensation film 7041 and a second optical compensation film 7042, The first optical compensation film 7041 is disposed on a surface of the polarizing layer 702 that is close to the reflection layer (or the quarter-wave plate 703), and the second optical compensation film 7042 is disposed on a surface of the first optical compensation film 7041 that is close to the reflection layer (or the quarter-wave plate 703). The first optical compensation film 7041 and the second optical compensation film 7042 are both made of wave plates.

Herein, a refractive index factor Nz of the first optical compensation film 7041 is smaller than or equal to 0, a refractive index factor Nz of the second optical compensation film 7042 is larger than or equal to 1, phase retardations of both the first optical compensation film 7041 and the second optical compensation film 7042 are in a range from 110 nm to 160 nm, and an angle between any one of slow axes of the first optical compensation film 7041 and the second optical compensation film 7042 and a transmission axis of the polarizing layer 702 is in a range from +85° to +95° or from −95° to −85°.

As an example, the phase retardations of both the first optical compensation film 7041 and the second optical compensation film 7042 are 137 nm, the angle between any one of slow axes of the first optical compensation film 7041 and the second optical compensation film 7042 and a transmission axis of the polarizing layer 702 is +90° or −90°.

Alternatively, a refractive index factor Nz of the first optical compensation film 7041 is larger than or equal to 1, a refractive index factor Nz of the second optical compensation film 7042 is smaller than or equal to 0, phase retardations of both the first optical compensation film 7041 and the second optical compensation film 7042 are in a range from 110 nm to 160 nm, and the angle between any one of slow axes of the first optical compensation film 7041 and the second optical compensation film 7042 and a transmission axis of the polarizing layer 702 is −5° to +5°.

As an example, the phase retardations of both the first optical compensation film 7041 and the second optical compensation film 7042 are 137 nm, the angle between any one of slow axes of the first optical compensation film 7041 and the second optical compensation film 7042 and a transmission axis of the polarizing layer 702 is 0°.

Alternatively, a refractive index factor Nz of the first optical compensation film 7041 is smaller than or equal to 0, an angle between its slow axis and a transmission axis of the polarizing layer 702 is in a range from −5° to +5°, a refractive index factor Nz of the second optical compensation film 7042 is larger than or equal to 1, an angle between its slow axis and a transmission axis of the polarizing layer 702 is in a range from +85° to +95° or in a range from −95° to −85°, phase retardations of both the first optical compensation film 7041 and the second optical compensation film 7042 are in a range from 110 nm to 160 nm.

As an example, the angle between the slow axis of the first optical compensation film 7041 and the transmission axis of the polarizing layer 702 is 0°, the angle between the slow axis of the second optical compensation film 7042 and the transmission axis of the polarizing layer 702 is +90° or −90°, the phase retardations of both the first optical compensation film 7041 and the second optical compensation film 7042 are 137 nm.

Alternatively, a refractive index factor Nz of the first optical compensation film 7041 larger than or equal to 1, an angle between its slow axis and a transmission axis of the polarizing layer 702 is in a range from +85° to +95° or −95° to −85°, a refractive index factor Nz of the second optical compensation film 7042 is smaller than or equal to 0, an angle between its slow axis and a transmission axis of the polarizing layer 702 is in a range from −5° to +5°, phase retardations of both the first optical compensation film 7041 and the second optical compensation film 7042 are in a range from 110 nm to 160 nm As an example, the angle between the slow axis of the first optical compensation film 7041 and the transmission axis of the polarizing layer 702 is +90° or −90°, the angle between the slow axis of the second optical compensation film 7042 and the transmission axis of the polarizing layer 702 is 0°, the phase retardations of both the first optical compensation film 7041 and the second optical compensation film 7042 are 137 nm.

The compensation layer of the polarizer of the embodiment uses two optical compensation films, and neither of the refractive index factors of the two optical compensation layers is in the range of (0, 1), which solves the problem of the oblique light leakage caused by the deflection of the transmission axis of the polarizing layer 702, especially alleviating the light leakage in the direction with the polar angle of 40° to 80° and the azimuth angle of about 45°, 135°, 225° and 315°. Moreover, the process is simple, cost is low, phase retardation of each optical compensation film is small and the thickness is thin, making it easy to implement.

When the refractive index factor Nz of the first optical compensation film 7041 is 1, the phase retardation R0 is 137.5 nm, the angle between its slow axis and the transmission axis of the polarizing layer 702 is +90°, the refractive index factor Nz of the second optical compensation film 7042 is 0, the phase retardation R0 is 137.5 nm, the angle between its slow axis and the transmission axis of the polarizing layer 702 is 0°, and the refractive index factor Nz of the quarter-wave plate 703 is 1, the phase retardation R0 is 137.5, the angle between its slow axis and the transmission axis of the polarizing layer 702 is +45°, the maximum light leakage rate of the polarizer is about 3.5% (that is, light leakage diagram at various angles of the polarizer with parameters described herein is the same as that illustrated in FIG. 9). It is thus seen that in comparison with known circular polarizer, the maximum light leakage rate of the polarizer of the embodiment is reduced by about 1.5%, thereby improving the outdoors readability of OLED displays using the polarizer; moreover, the viewing angle becomes better as well.

The embodiment further provides a display device comprising the above polarizer.

Other structures and functions of the embodiment are the same as those in Embodiment 2 and will not be elaborated here.

Embodiment 6

The embodiment differs from Embodiment 5 in the following.

In the embodiment, the refractive index factor Nz of the quarter-wave plate 703 is in a range from 0.4 to 0.6, the phase retardation R0 is in a range from 110 nm to 160 nm, and the angle between the slow axis of the quarter-wave plate 703 and the transmission axis of the polarizing layer 702 is in a range from +40° to +50° or in a range from −50° to −40°.

As an example, the refractive index factor Nz of the quarter-wave plate 703 is 0.5, the phase retardation R0 is 137.5 nm, and the angle between the slow axis of the quarter-wave plate 703 and the transmission axis of the polarizing layer 702 is +45° or −45°.

The compensation layer of the polarizer of the embodiment uses two optical compensation films, which solves the problem of oblique light leakage caused by the deflection of the transmission axis of the polarizing layer 702, especially alleviating the light leakage in the direction with the polar angle of 40° to 80° and the azimuth angle of about 45°, 135°, 225° and 315°. Moreover, the process is simple, cost is low, phase retardation of each optical compensation film is small and the thickness is thin, making it easy to implement. Meanwhile, the quarter-wave plate with the refractive index factor Nz of 0.5 is used, which solves the problem of oblique light leakage caused by the deflection of the optical axis of the quarter-wave plate in the known circular polarizer, especially alleviating the light leakage in the direction with the polar angle of 40° to 80° and the azimuth angle of about 0°, 90°, 180° and 270°. That is to say, the polarizer of the embodiment compensates for the problem of oblique light leakage caused by the deflection of the transmission axis of the polarizing layer and the deflection of the optical axis of the quarter-wave plate at the same time; meanwhile, it simultaneously prevents the vertical and oblique light leakage of the polarizer, having a better viewing angle.

When the refractive index factor Nz of the first optical compensation film 7041 is 1, the phase retardation R0 is 137.5 nm, the angle between its slow axis and the transmission axis of the polarizing layer 702 is +90°, the refractive index factor Nz of the second optical compensation film 7042 is 0, the phase retardation R0 is 137.5 nm, the angle between its slow axis and the transmission axis of the polarizing layer 702 is 0°, and the refractive index factor Nz of the quarter-wave plate 703 is 0.5, the phase retardation R0 is 137.5, the angle between its slow axis and the transmission axis of the polarizing layer 702 is +45°, the maximum light leakage rate of the polarizer is about 0.12% (that is, light leakage diagram at various angles of the polarizer with parameters described herein is the same as that illustrated in FIG. 10). It is thus seen that in comparison with known circular polarizer, the maximum light leakage rate of the polarizer of the embodiment is reduced by about 4.88%, thereby improving the outdoors readability of OLED displays using the polarizer; moreover, the viewing angle becomes better as well.

The embodiment further provides a display device comprising the above polarizer.

Other structures and functions of the embodiment are the same as those in Embodiment 5 and will not be elaborated here.

Embodiment 7

Figure 13:
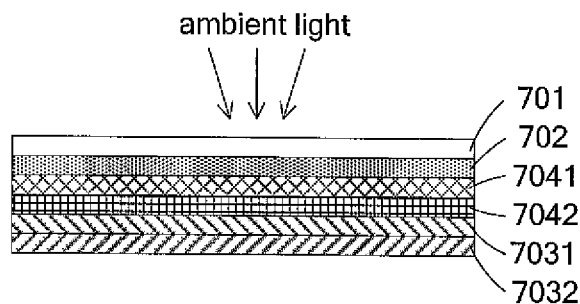
FIG. 13 schematically illustrates a configuration of a polarizer in accordance with Embodiment 7 of the invention.

As illustrated in FIG. 13, the embodiment differs from Embodiment 5 in the following.

In the embodiment, the quarter-wave plate 703 comprises a first one-eighth wave plate 7031 and a second one-eighth wave plate 7032, and polarity of the first one-eighth wave plate 7031 and that of the second one-eighth wave plate 7032 are opposite to each other. A sum of a refractive index factor Nz of the first one-eighth wave plate 7031 and a refractive index factor Nz of the second one-eighth wave plate 7032 is in a range from 0.85 to 1.15, the phase retardations R0 of the first one-eighth wave plate 7031 and the second one-eighth wave plate 7032 are both in a range from 55 nm to 80 nm, slow axes of the first one-eighth wave plate 7031 and the second one-eighth wave plate 7032 are in the same direction and both have an angle of +40° to +50° or −50° to −40° with the transmission axis of the polarizing layer 702.

As an example, the sum of the refractive index factor Nz of the first one-eighth wave plate 7031 and the refractive index factor Nz of the second one-eighth wave plate 7032 is 1, the phase retardations R0 of the first one-eighth wave plate and the second one-eighth wave plate are both 69 nm, the slow axes of the first one-eighth wave plate 7031 and the second one-eighth wave plate 7032 are in the same direction and both have an angle of +45° or −45 with the transmission axis of the polarizing layer 702.

The polarizer of the embodiment uses two optical compensation films, which solves the problem of oblique light leakage caused by the deflection of the transmission axis of the polarizing layer, especially alleviating the light leakage in the direction with the polar angle of 40° to 80° and the azimuth angle of about 45°, 135°, 225° and 315°. Moreover, the process is simple, cost is low, phase retardation of each optical compensation film is small and the thickness is thin, making it easy to implement. Meanwhile, the first one-eighth wave plate 7031 and the second one-eighth wave plate 7032 having opposite polarities are used, which solves the issue of oblique light leakage caused by the deflection of the optical axis of the quarter-wave plate in the known circular polarizer, especially alleviating the light leakage for the direction with the polar angle of 40° to 80° and the azimuth angle of about 0°, 90°, 180° and 270°. Moreover, the process is simple and the cost is low; each layer of one-eighth wave plate has relatively small phase retardation and a small thickness, making it easily implemented. That is to say, the polarizer of the embodiment compensates the problem of oblique light leakage caused by the deflection of the transmission axis of the polarizing layer and the deflection of the optical axis of the quarter-wave plate at the same time, and simultaneously prevents the vertical and oblique light leakage of the polarizer, forming better viewing angles.

When the refractive index factor Nz of the first optical compensation film 7041 is 1, the phase retardation R0 is 137.5 nm, the angle between its slow axis and the transmission axis of the polarizing layer 702 is +90°, the refractive index factor Nz of the second optical compensation film 7042 is 0, the phase retardation R0 is 137.5 nm, the angle between its slow axis and the transmission axis of the polarizing layer 702 is 0°, the refractive index factor Nz of the first one-eighth wave plate 7031 is 1, the phase retardation R0 is 68.75, the angle between its slow axis and the transmission axis of the polarizing layer 702 is +45°, and the refractive index factor Nz of the second one-eighth wave plate 7032 is 0, the phase retardation R0 is 68.75, the angle between its slow axis and the transmission axis of the polarizing layer 702 is −45°, the maximum light leakage rate of the polarizer is about 0.12% (that is, light leakage diagram at various angles of the polarizer with parameters described herein is the same as that illustrated in FIG. 10). It is thus seen that in comparison with known circular polarizer, the maximum light leakage rate of the polarizer of the embodiment is reduced by about 4.88%, thereby improving the outdoors readability of OLED displays using the polarizer; moreover, the viewing angle becomes better as well.

The embodiment further provides a display device comprising the above polarizer.

Other structures and functions of the embodiment are the same as those in Embodiment 5 and will not be elaborated here.

Embodiment 8

The embodiment differs from embodiment 1 in the following.

The compensation layer comprises a quarter-wave plate, a refractive index factor Nz of the quarter-wave plate is in a range from 0.4 to 0.6, a phase retardation R0 is in a range from 110 nm to 160 nm, and an angle between the slow axis of the quarter-wave plate and a transmission axis of the polarizing layer is in a range from +40° to +50° or in a range from −50° to −40°.

As an example, the refractive index factor Nz of the quarter-wave plate is 0.5, the phase retardation R0 is 137.5 nm, and the angle between the slow axis of the quarter-wave plate and the transmission axis of the polarizing layer 702 is +45° or −45°.

Figure 3:
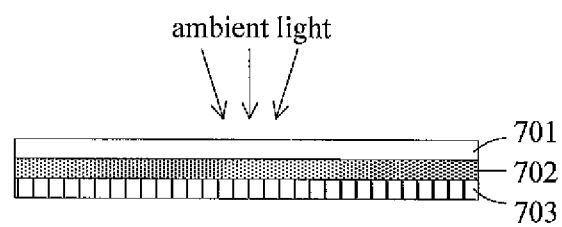
FIG. 3 schematically illustrates a configuration of a circular polarizer of FIG. 2.
Figure 4:
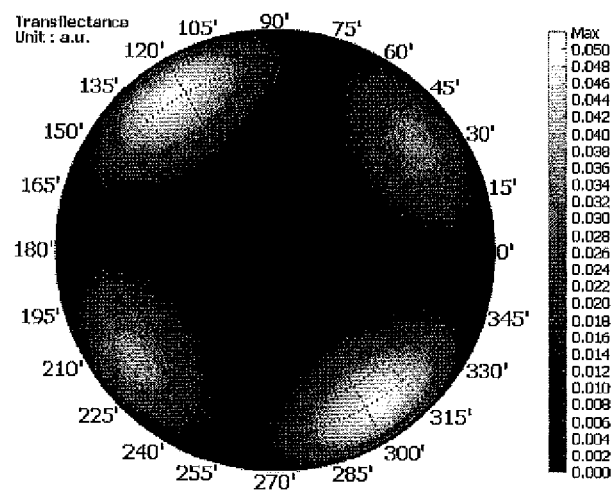
FIG. 4 is a diagram schematically illustrating light leakage at various viewing angles for the circular polarizer of FIG. 3.

The configuration of the polarizer of the embodiment is the same as that of FIG. 3, other than the refractive index factor Nz of the quarter-wave plate. Therefore, no schematic configuration of the polarizer of the embodiment is provided.

In the embodiment, if a quarter-wave plate with an refractive index factor Nz of 0.5 is used as the compensation layer, it can solve the problem of oblique light leakage caused by the deflection of the optical axis of the quarter-wave plate in the known circular polarizer, especially alleviating the light leakage in the direction with the polar angle of 40° to 80° and the azimuth angle of about 0°. According to the symmetry of optical structures, the polarizer of the embodiment can also reduce light leakage in the direction with the polar angle of 40° to 80° and the azimuth angle of about 90°, 180° and 270°.

As an example, the polarizer further comprises a protection layer; the protection layer is disposed on a surface of the polarizing layer that is far from the quarter-wave plate.

Figure 14:
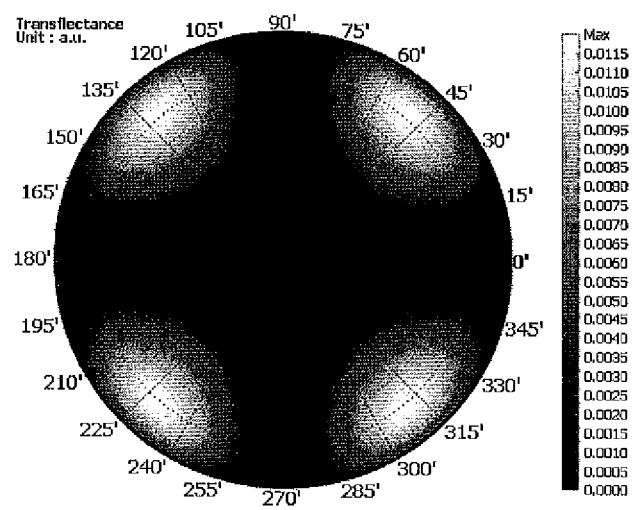
FIG. 14 is a diagram schematically illustrating light leakage at various viewing angles for the polarizer of Embodiment 8.

As illustrated in FIG. 14, when the refractive index factor Nz of the quarter-wave plate is 0.5, the phase retardation R0 is 137.5 nm, the angle between its slow axis and the transmission axis of the polarizing layer is +45°, the maximum light leakage rate of the polarizer is about 1.15%. It is thus seen that in comparison with known circular polarizer, the maximum light leakage rate of the polarizer of the embodiment is reduced by about 3.85%, thereby improving the outdoors readability of OLED displays using the polarizer; moreover, the viewing angle becomes better as well.

The embodiment further provides a display device comprising the above polarizer.

Other structures and functions of the embodiment are the same as those in Embodiment 1 and will not be elaborated here.

Embodiment 9

Figure 15:
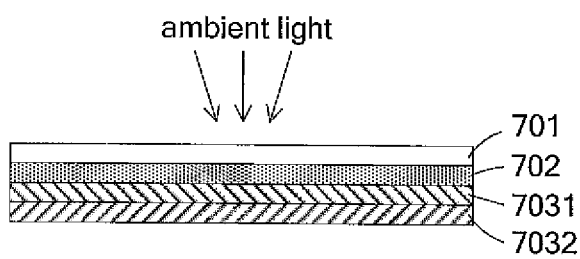
FIG. 15 schematically illustrates a configuration of a polarizer in accordance with Embodiment 9 of the invention.

As illustrated in FIG. 15, the embodiment differs from Embodiment 1 in the following.

The compensation layer comprises a quarter-wave plate, the quarter-wave plate comprises a first one-eighth wave plate 7031 and a second one-eighth wave plate 7032, and polarity of the first one-eighth wave plate 7031 and that of the second one-eighth wave plate 7032 are opposite to each other. A sum of a refractive index factor Nz of the first one-eighth wave plate 7031 and a refractive index factor Nz of the second one-eighth wave plate 7032 is in a range from 0.85 to 1.15, the phase retardations R0 of the first one-eighth wave plate 7031 and the second one-eighth wave plate 7032 are both in a range from 55 nm to 80 nm, slow axes of the first one-eighth wave plate 7031 and the second one-eighth wave plate 7032 are in the same direction and both have an angle of +40° to +50° or −50° to −40° with the transmission axis of the polarizing layer 702.

As an example, the sum of the refractive index factor Nz of the first one-eighth wave plate 7031 and the refractive index factor Nz of the second one-eighth wave plate 7032 is 1, the phase retardations R0 of the first one-eighth wave plate and the second one-eighth wave plate are both 69 nm, the slow axes of the first one-eighth wave plate 7031 and the second one-eighth wave plate 7032 are in the same direction and both have an angle of +45° or −45 with the transmission axis of the polarizing layer 702.

The compensation layer in the polarizer of the embodiment uses two one-eighth wave plates having opposite polarities to solve the issue of oblique light leakage caused by the deflection of the optical axis of the quarter-wave plate in the known circular polarizer, reducing light leakage at various angle to a certain extent, especially alleviating the light leakage for the direction with the polar angle of 40° to 80° and the azimuth angle of about 0°, 90°, 180° and 270°. Moreover, if the sum of the refractive index factors Nz of the two one-eighth wave plates is 1 (or larger than 1), the refractive index factor Nz of the first one-eighth wave plate 7031 and that of the second one-eighth wave plate 7032 may be respective 0 and 1, that is, neither the refractive index factors of the two one-eighth wave plates is in the range of (0, 1). Therefore, the embodiment has the advantages of having simple process and low cost. Meanwhile, each of one-eighth wave plates has relatively small phase retardation and a small thickness, making it easily implemented.

As an example, the polarizer further comprises a protection layer 701; the protection layer 701 is disposed on a surface of the polarizing layer 702 that is far from the first one-eighth wave plate 7031.

When the refractive index factor Nz of the first one-eighth wave plate 7031 is 1, the phase retardation R0 is 68.75, the angle between its slow axis and the transmission axis of the polarizing layer 702 is +45°, and the refractive index factor Nz of the second one-eighth wave plate 7032 is 0, the phase retardation R0 is 68.75, the angle between its slow axis and the transmission axis of the polarizing layer 702 is −45°, the maximum light leakage rate of the polarizer is about 1.15% (that is, light leakage diagram at various angles of the polarizer with parameters described herein is the same as that illustrated in FIG. 14). It is thus seen that in comparison with known circular polarizer, the maximum light leakage rate of the polarizer of the embodiment is reduced by about 3.85%, thereby improving the outdoors readability of OLED displays using the polarizer; moreover, the viewing angle becomes better as well.

The embodiment further provides a display device comprising the above polarizer.

Other structures and functions of the embodiment are the same as those in Embodiment 1 and will not be elaborated here.

What are described above is related to the illustrative embodiments of the invention only and not limitative to the scope of the disclosure; the scopes of the invention are defined by the accompanying claims.

What is claimed is:

1. A polarizer, wherein the polarizer is configured as being used in combination with a reflection layer, the polarizer comprises a polarizing layer and a compensation layer, the compensation layer is disposed between the polarizing layer and the reflection layer, wherein the compensation layer comprises a quarter-wave plate and an optical compensation film, the optical compensation film is disposed between the polarizing layer and the quarter-wave plate, the optical compensation film is made of a wave plate;

a refractive index factor of the optical compensation film is in a range from 0.3 to 0.4, phase retardation is in a range from 240 nm to 300 nm, and an angle between a slow axis of the optical compensation film and a transmission axis of the polarizing layer is in a range from −5° to +5°;

or a refractive index factor of the optical compensation film is in a range from 0.7 to 0.8, phase retardation is in a range from 240 nm to 300 nm, and an angle between a slow axis of the optical compensation film and a transmission axis of the polarizing layer is in a range from +85° to +95° or in a range from −95° to −85°.

2. The polarizer of claim 1, wherein
the refractive index factor of the optical compensation film is 0.25, the phase retardation is 275 nm, and the angle between the slow axis of the optical compensation film and the transmission axis of the polarizing layer is 0°;
or the refractive index factor of the optical compensation film is 0.75, the phase retardation is 275 nm, and the angle between the slow axis of the optical compensation film and the transmission axis of the polarizing layer is +90° or −90°.

3. The polarizer of claim 1, wherein
the compensation layer comprises a quarter-wave plate, a first optical compensation film and a second optical compensation film, the first optical compensation film is disposed on a surface of the polarizing layer that is close to the reflection layer, the second optical compensation film is disposed on a surface of the first optical compensation film that is close to the reflection layer, the quarter-wave plate is disposed on a surface of the second optical compensation film that is close to the reflection layer, the first optical compensation film and the second optical compensation film are both made of wave plates.

4. The polarizer of claim 3, wherein
a refractive index factor of the first optical compensation film is smaller than or equal to 0, a refractive index factor of the second optical compensation film is larger than or equal to 1, phase retardations of both the first optical compensation film and the second optical compensation film are in a range from 110 nm to 160 nm, and an angle between any one of slow axes of the first optical compensation film and the second optical compensation film and a transmission axis of the polarizing layer is in a range from +85° to +95° or in a range from −95° to −85°.

5. The polarizer of claim 3, wherein
a refractive index factor of the first optical compensation film is larger than or equal to 1, a refractive index factor of the second optical compensation film is smaller than or equal to 0, phase retardations of both the first optical compensation film and the second optical compensation film are in a range from 110 nm to 160 nm, and an angle between any one of slow axes of the first optical compensation film and the second optical compensation film and a transmission axis of the polarizing layer is in a range from −5° to +5°.

6. The polarizer of claim 3, wherein
a refractive index factor of the first optical compensation film is smaller than or equal to 0, an angle between its slow axis and a transmission axis of the polarizing layer is in a range from −5° to +5°, a refractive index factor of the second optical compensation film is larger than or equal to 1, an angle between its slow axis and a transmission axis of the polarizing layer is in a range from +85° to +95° or in a range from −95° to −85°, phase retardations of both the first optical compensation film and the second optical compensation film are in a range from 110 nm to 160 nm.

7. The polarizer of claim 3, wherein
a refractive index factor of the first optical compensation film is larger than or equal to 1, and an angle between its slow axis and a transmission axis of the polarizing layer is in a range from +85° to +95° or in a range from −95° to −85°; a refractive index factor of the second optical compensation film is smaller than or equal to 0, and an angle between its slow axis and a transmission axis of the polarizing layer is in a range from −5° to +5°; phase retardations of both the first optical compensation film and the second optical compensation film are in a range from 110 nm to 160 nm.

8. The polarizer of claim 4, wherein
the refractive index factor of the first optical compensation film is smaller than or equal to 0, the refractive index factor of the second optical compensation film is larger than or equal to 1, the phase retardations of both the first optical compensation film and the second optical compensation film are 137 nm, and the angle between any one of slow axes of the first optical compensation film and the second optical compensation film and the transmission axis of the polarizing layer is +90° or −90°.

9. The polarizer of claim 5, wherein
the refractive index factor of the first optical compensation film is larger than or equal to 1, the refractive index factor of the second optical compensation film is smaller than or equal to 0, the phase retardations of both the first optical compensation film and the second optical compensation film are 137 nm, and the angle between any one of slow axes of the first optical compensation film and the second optical compensation film and the transmission axis of the polarizing layer is 0°.

10. The polarizer of claim 6, wherein
the refractive index factor of the first optical compensation film is smaller than or equal to 0, and the angle between its slow axis and a transmission axis of the polarizing layer is 0°; the refractive index factor of the second optical compensation film is larger than or equal to 1, and the angle between its slow axis and a transmission axis of the polarizing layer is +90° or −90°; the phase retardations of both the first optical compensation film and the second optical compensation film are 137 nm.

11. The polarizer of claim 7, wherein
the refractive index factor of the first optical compensation film is larger than or equal to 1, and the angle between its slow axis and a transmission axis of the polarizing layer is +90° or −90°; the refractive index factor of the second optical compensation film is smaller than or equal to 0, and the angle between its slow axis and a transmission axis of the polarizing layer is 0°; the phase retardations of both the first optical compensation film and the second optical compensation film are 137 nm.

12. The polarizer of claim 1, wherein the compensation layer comprises a quarter-wave plate, a refractive index factor of the quarter-wave plate is in a range from 0.4 to 0.6, phase retardation is in a range from 110 nm to 160 nm, and an angle between the slow axis of the quarter-wave plate and the transmission axis of the polarizing layer is in a range from +40° to +50° or in a range from −50° to −40°.

13. The polarizer of claim 12, wherein the refractive index factor of the quarter-wave plate is 0.5, the phase retardation is 137.5 nm, and the angle between the slow axis of the quarter-wave plate and the transmission axis of the polarizing layer is +45° or −45°.

14. The polarizer of claim 1, wherein the compensation layer comprises a quarter-wave plate, the quarter-wave plate comprises a first one-eighth wave plate and a second one-eighth wave plate, and polarities of the first one-eighth wave plate and the second one-eighth wave plate are opposite to each other; a sum of a refractive index factor of the first one-eighth wave plate and that of the second one-eighth wave plate is in a range from 0.85 to 1.15, phase retardations of the first one-eighth wave plate and the second one-eighth wave plate are both in a range from 55 nm to 80 nm, slow axes of the first one-eighth wave plate and the second one-eighth wave plate are in the same direction and both have an angle of +40° to +50° or −50° to −40° with the transmission axis of the polarizing layer.

15. The polarizer of claim 14, wherein the sum of the refractive index factor of the first one-eighth wave plate and the refractive index factor of the second one-eighth wave plate is 1, the phase retardations of the first one-eighth wave plate and the second one-eighth wave plate are both 69 nm, the slow axes of the first one-eighth wave plate and the second one-eighth wave plate are in the same direction and both have an angle of +45° or −45 with the transmission axis of the polarizing layer.

16. The polarizer of claim 1, further comprising a protection layer, the protection layer is disposed on a surface of the polarizing layer that is far from the compensation layer.

17. A display device comprising the polarizer of claim 1.

18. The display device of claim 17, wherein the compensation layer comprises a quarter-wave plate, a first optical compensation film and a second optical compensation film, the first optical compensation film is disposed on a surface of the polarizing layer that is close to the reflection layer, the second optical compensation film is disposed on a surface of the first optical compensation film that is close to the reflection layer, the quarter-wave plate is disposed on a surface of the second optical compensation film that is close to the reflection layer, the first optical compensation film and the second optical compensation film are both made of wave plates.

* * * * *